United States Patent
Ueda et al.

(10) Patent No.: US 11,691,814 B2
(45) Date of Patent: Jul. 4, 2023

(54) WAREHOUSING AND SHIPPING OPERATION SUPPORT SYSTEM, WAREHOUSING AND SHIPPING OPERATION SUPPORT METHOD, AND NON-TRANSITORY COMPUTER-READABLE MEDIUM

(71) Applicant: SATO HOLDINGS KABUSHIKI KAISHA, Tokyo (JP)

(72) Inventors: Yoshiyuki Ueda, Tokyo (JP); Yoshimasa Ueda, Tokyo (JP)

(73) Assignee: SATO HOLDINGS KABUSHIKI KAISHA, Tokyo (JP)

(*) Notice: Subject to any disclaimer, the term of this patent is extended or adjusted under 35 U.S.C. 154(b) by 201 days.

(21) Appl. No.: 15/748,855

(22) PCT Filed: Jul. 29, 2016

(86) PCT No.: PCT/JP2016/072289
§ 371 (c)(1),
(2) Date: Jan. 30, 2018

(87) PCT Pub. No.: WO2017/022657
PCT Pub. Date: Feb. 9, 2017

(65) Prior Publication Data
US 2018/0215542 A1 Aug. 2, 2018

(30) Foreign Application Priority Data

Jul. 31, 2015 (JP) .................................. 2015-151817
Dec. 25, 2015 (JP) .................................. 2015-253457

(51) Int. Cl.
*B65G 1/137* (2006.01)
*G06Q 10/08* (2023.01)
(Continued)

(52) U.S. Cl.
CPC ........... *B65G 1/1371* (2013.01); *G06Q 10/06* (2013.01); *G06Q 10/08* (2013.01); *G06Q 50/28* (2013.01); *G06Q 50/30* (2013.01)

(58) Field of Classification Search
CPC ...... B65G 1/1371; G06Q 10/06; G06Q 10/08; G06Q 50/28; G06Q 50/30
See application file for complete search history.

(56) References Cited

U.S. PATENT DOCUMENTS

| | | | |
|---|---|---|---|
| 7,518,511 B1* | 4/2009 | Panj .................. | G07G 1/009 340/568.1 |
| 8,244,603 B1* | 8/2012 | Tang .................. | G06Q 10/0633 705/28 |

(Continued)

FOREIGN PATENT DOCUMENTS

| | | |
|---|---|---|
| JP | 2-163202 A | 6/1990 |
| JP | 2005-350222 A | 12/2005 |

(Continued)

OTHER PUBLICATIONS

Tejesh, B. Sai Subrahmanya, and S. J. A. E. J. Neeraja. "Warehouse inventory management system using IoT and open source framework." Alexandria engineering journal 57.4 (2018): 3817-3823. (Year: 2018).*

(Continued)

*Primary Examiner* — Nathan A Mitchell
(74) *Attorney, Agent, or Firm* — Foley & Lardner LLP (57) ABSTRACT

A warehousing and shipping operation support system stores first coded information contained in an optical recognition code attached to each of a plurality of objects, acquires the first coded information contained in an optical recognition code attached to a target object out of the plurality of objects, automatically acquires location information of a working radio communication terminal, and associates the stored first (Continued)

coded information with the acquired location information of the working radio communication terminal.

6 Claims, 12 Drawing Sheets

(51) Int. Cl.
*G06Q 10/06* (2023.01)
*G06Q 50/30* (2012.01)
*G06Q 50/28* (2012.01)

(56) References Cited

U.S. PATENT DOCUMENTS

| | | | | |
|---|---|---|---|---|
| 8,423,431 | B1* | 4/2013 | Rouaix | G06Q 10/087 |
| | | | | 705/28 |
| 8,561,897 | B2* | 10/2013 | Kunzig | G06Q 10/087 |
| | | | | 235/385 |
| 9,082,131 | B2 | 7/2015 | O'Connor | |
| 9,248,965 | B1* | 2/2016 | Kritchevsky | G11B 17/225 |
| 2006/0022824 | A1* | 2/2006 | Olsen | B07C 7/005 |
| | | | | 340/572.1 |
| 2011/0163159 | A1* | 7/2011 | Thomas | B66C 13/46 |
| | | | | 235/384 |
| 2013/0193200 | A1* | 8/2013 | O'Connor | G06Q 30/0241 |
| | | | | 235/375 |
| 2015/0242918 | A1* | 8/2015 | McCarthy | G06Q 30/0635 |
| | | | | 705/26.43 |
| 2016/0307148 | A1* | 10/2016 | Jones | G06Q 20/208 |
| 2016/0328784 | A1* | 11/2016 | Jones | H04W 4/021 |
| 2018/0005309 | A1* | 1/2018 | Croy | G06Q 30/0639 |
| 2020/0027055 | A1* | 1/2020 | Delaney | G16H 20/10 |

FOREIGN PATENT DOCUMENTS

| | | | |
|---|---|---|---|
| JP | 2009-215007 A | | 9/2009 |
| JP | 2009215007 A | * | 9/2009 |
| JP | 4699894 B2 | * | 6/2011 |
| JP | 2012-171759 A | | 9/2012 |
| JP | 2015-519621 A | | 7/2015 |

OTHER PUBLICATIONS

Patil, Rasika, Shikha Nema, and Suraj Kadam. "Radio frequency identification system for asset tracking and inventory management in hospitals." 2017 4th International Conference on Signal Processing and Integrated Networks (SPIN). IEEE, 2017. (Year: 2017).*

Tsai, Meng-Hsiun, et al. "RFID medical equipment tracking system based on a location-based service technique." Journal of Medical and Biological Engineering 39 (2019): 163-169. (Year: 2019).*

* cited by examiner

WAREHOUSING AND SHIPPING OPERATION SUPPORT SYSTEM, WAREHOUSING AND SHIPPING OPERATION SUPPORT METHOD, AND NON-TRANSITORY COMPUTER-READABLE MEDIUM

TECHNICAL FIELD

The present invention relates to a technology for supporting a warehousing and shipping operation in a warehouse or the like.

BACKGROUND ART

JP2-163202A discusses a management system that acquires information on an object and its storage position associated with each other as an operator reads a bar code attached to the object and a bar code attached to a storage rack of the object during a warehousing and shipping operation.

SUMMARY OF INVENTION

In the aforementioned system, the operator is required to read two bar codes during the warehousing and shipping operation. Therefore, work efficiency is unsatisfactory disadvantageously.

In view of the aforementioned problems, it is therefore an object of the present invention to efficiently perform the warehousing and shipping operation.

According to an aspect of the invention, there is provided a warehousing and shipping operation support system including: memory means storing first coded information contained in an optical recognition code attached to each of a plurality of objects; coded information acquiring means configured to acquire the first coded information contained in the optical recognition code attached to a target object out of the plurality of objects; location information acquiring means configured to automatically acquire location information of a working radio communication terminal; and processing means configured to associate the first coded information stored in the memory means with the location information of the working radio communication terminal acquired by the location information acquiring means.

In this aspect of the Invention, the first coded information corresponding to the object is associated with the automatically acquired location information of the working radio communication terminal. Therefore, it is possible to specify a location of the object without a cumbersome work. Accordingly, it is possible to efficiently perform a warehousing and shipping operation.

DESCRIPTION OF EMBODIMENTS

First Embodiment

A warehousing and shipping operation support system (hereinafter, referred to as a "support system") 100 according to a first embodiment of the invention will now be described with reference to the accompanying drawings.

The support system 100 is a system for improving efficiency of a warehousing and shipping operation in a logistic warehouse by using location information of a communication tag 10 as a working radio communication terminal held by an operator.

Figure 1:
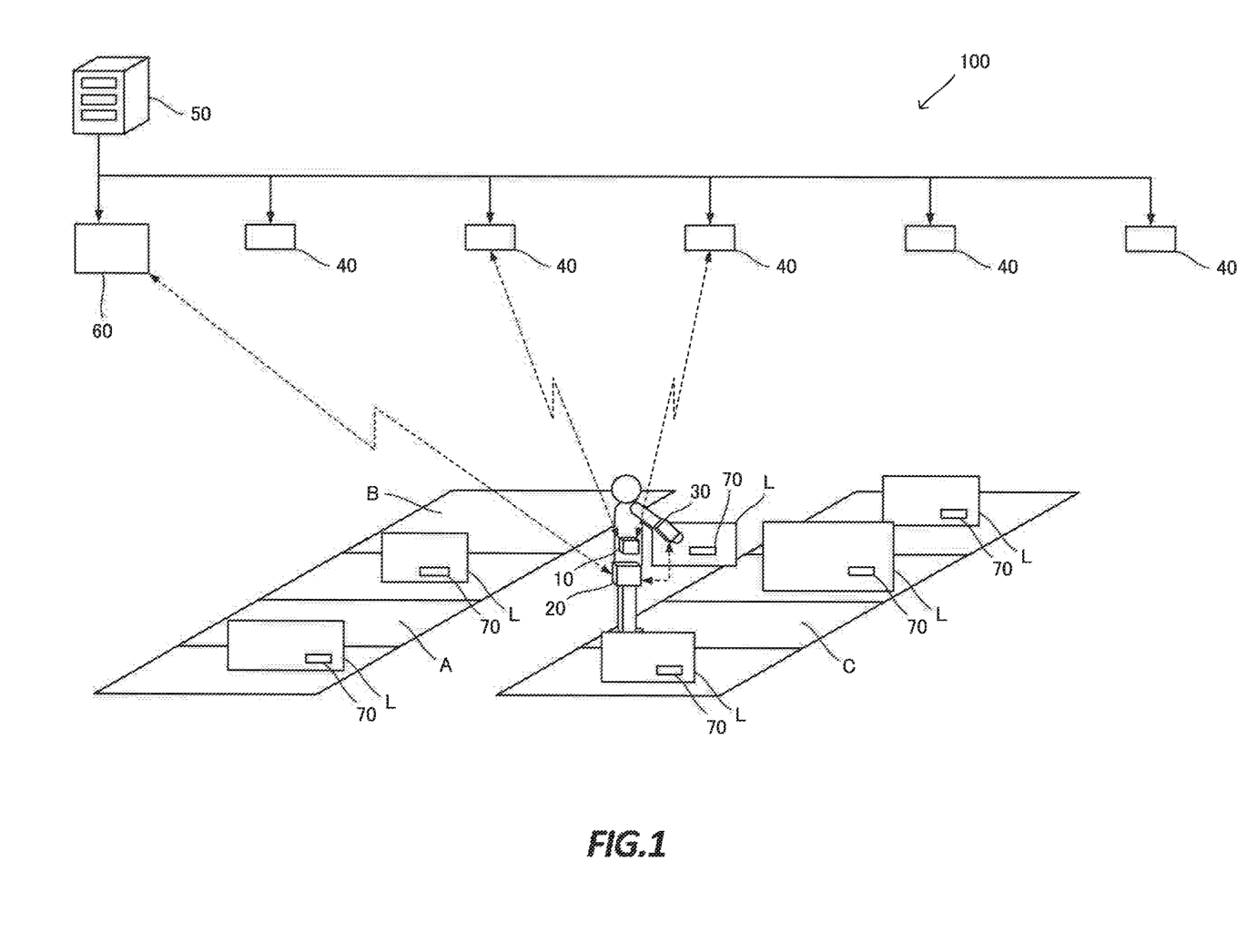
FIG. 1 is a diagram schematically illustrating a warehousing and shipping operation support system according to a first embodiment of the invention.

FIG. 1 is a diagram schematically illustrating the support system 100. Referring to FIG. 1, an operator performs a warehousing operation to store a target object L in a storage space C out of empty storage spaces A to C.

As illustrated in FIG. 1, the support system 100 includes a communication tag 10 held by an operator, a portable terminal 20 held by the operator, a scanner 30 communicatably connected to the portable terminal 20 and used in an inspection process for the object L, a plurality of fixed communication units 40 installed in the vicinity of a ceiling of the warehouse, and a computer 50 communicatably connected to the portable terminal 20 and each fixed communication unit 40.

The computer 50 and the portable terminal 20 are connected to each other via a wireless router 60. The wireless router 60 may also be embedded in the computer 50. In addition, the computer 50 and each fixed communication unit 40 are connected to each other in a wired manner. Furthermore, the scanner 30 and the portable terminal 20 may also be connected to each other in a wired or wireless manner.

Each object L is attached with a bar code 70 as an optical recognition code. First coded information of the bar code 70 (hereinafter, referred to as "first information") contains information on the object L attached with this bar code 70.

The information on the object L is information by which a content of the object L can be specified, such as a product name, a part number, and a color. Note that this information may not be directly contained in the first information, but information for specifying the information may be contained in the first information. The object L may include various types of articles such as a building material, furniture, a tire, a container containing an article, and an empty container containing no article.

Figure 2:
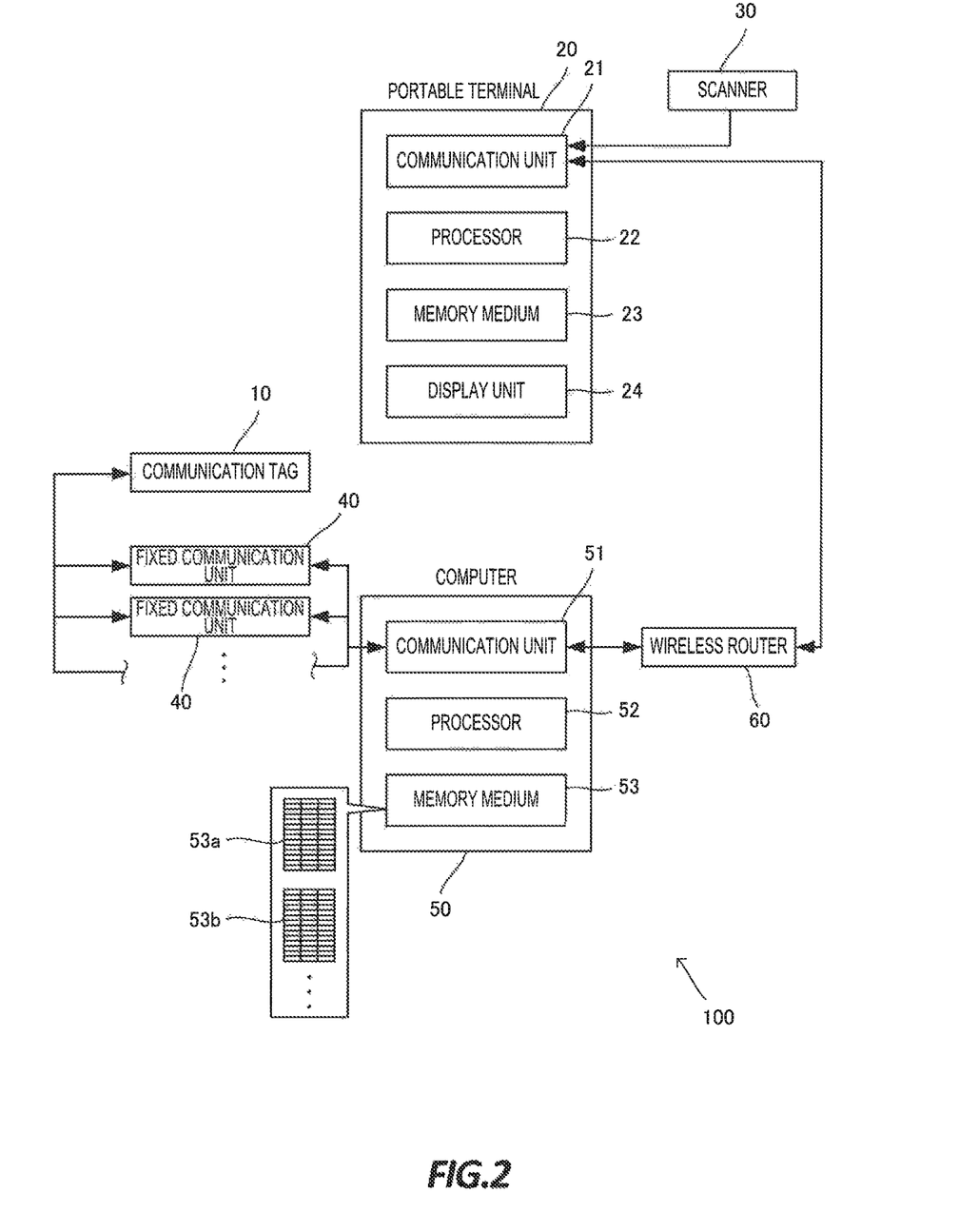
FIG. 2 is a schematic block diagram illustrating the warehousing and shipping operation support system according to the first embodiment of the invention.

FIG. 2 is a schematic block diagram illustrating the support system 100.

As illustrated in FIG. 2, the portable terminal 20 includes a communication unit 21 for performing communication, a processor 22 that performs various types of computation processes and the like, a memory medium 23 that stores various programs, and a display unit 24 that displays various types of information output from the processor 22.

The communication unit 21 may perform communication based on a typical scheme and may also perform communication, for example, based on a Bluetooth (registered trademark in Japan) low energy (BLE) scheme. The portable terminal 20 may include, for example, a smart phone, a tablet terminal, a head mount display terminal, and the like.

The computer 50 includes a communication unit 51 for performing communication, a processor 52 that performs various computation processes, and a memory medium 53 that stores a database that stores various programs, a database 53a that stores warehousing and shipping instruction data, a database 53b that stores information on the object L stored in the warehouse, first information contained in the bar code 70 attached to each object L, information on the storage space of each object L, and the like by associating them with each other.

The warehousing and shipping instruction data contains information on each object L that the warehousing and shipping operation will be performed and the first information contained in the bar code 70 attached to each object L. In addition, various programs or the like stored in the memory medium 53 can be used from the portable terminal 20.

The communication tag 10 is a tag that can be used in communication based on an ultra wide band (UWB) scheme and communicates with each fixed communication unit 40 capable of communication based on the similar UWB scheme at all times.

The computer 50 positions a location of the communication tag 10 on the basis of time for allowing the communication tag 10 to receive pulse signals transmitted from each of two fixed communication units 40 and return them to each fixed communication unit 40. In this manner, the support system 100 can automatically acquire location information of the communication tag 10, that is, location information of an operator on the basis of a relative positioning scheme. The location information of the communication tag 10 acquired automatically is stored in a database of the memory medium 53 as time-series data.

For example, in the state of FIG. 1, if an operator stores an object L in an empty storage space C and scans the bar code 70 using the scanner 30, the computer 50 associates the location information of the communication tag 10 at that time with the first information corresponding to the bar code 70 scanned by the operator out of the first information stored in the database 53b and determines that the storage space of the scanned object L is the storage space C on the basis of the location information of the communication tag 10. As a result, the location information of the communication tag 10, information on the storage space, the first information contained in the bar code 70, and the information on the object L are stored in the database 53b while they are associated with each other. Note that a prescribed storage space may not be specified on the basis of the location information of the communication tag 10, but the location of the communication tag 10 itself may be recognized as the storage space of the object L.

Subsequently, the warehousing and shipping operation using the support system 100 will be described.

First, the warehousing operation using the support system 100 will be described with reference to the operation flow of FIG. 3 and a displayed content of the display unit 24 of FIG. 4.

Figure 4:
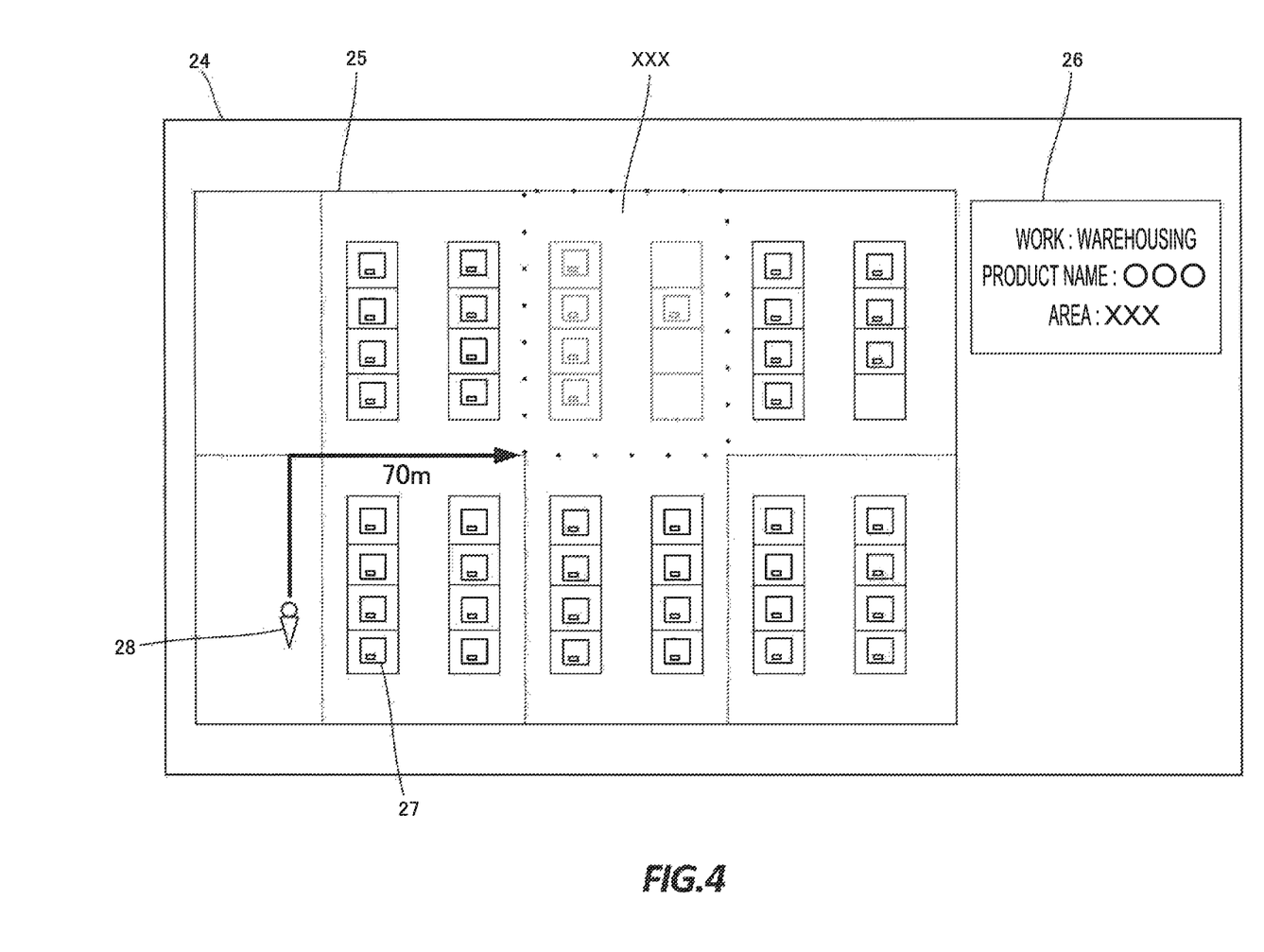
FIG. 4 is a diagram illustrating a displayed content on a display unit.

As illustrated in FIG. 4, a warehouse map 25, work information 26, and the like are displayed on the display unit 24 of the portable terminal 20. In addition, an object mark 27 may be displayed in a space where the object L is stored in the warehouse map 25 on the basis of the information stored in the database 53b, or an operator mark 28 may be displayed in a location of the operator in the warehouse map 25 on the basis of the location information of the communication tag 10. Note that the same content as that displayed in the display unit 24 may also be displayed in a monitor (not shown) of the computer 50.

In step S100, the computer 50 specifies an object L to be warehoused by an operator in the next time on the basis of the warehousing instruction data. Note that the computer 50 externally acquires the warehousing instruction data before the operation and stores it in the database 53a.

Subsequently, the computer 50 generates a warehousing instruction (step S101) and transmits it to the portable terminal 20 (step S102). The warehousing instruction includes information that represents the warehousing operation, information on the specified object L, and the like. In addition, the warehousing instruction may include information on a place where the next operation is to be performed.

Note that, in some cases, an inspection operation may be performed before the warehousing operation as an operator scans the bar code 70 attached to each object L using the scanner 30. In this case, as illustrated in step S099 of FIG. 11, before the warehousing operation, the location information of the communication tag 10 may be associated with the first information corresponding to the bar code 70 scanned by the operator out of the first information stored in the database 53b.

Figure 11:
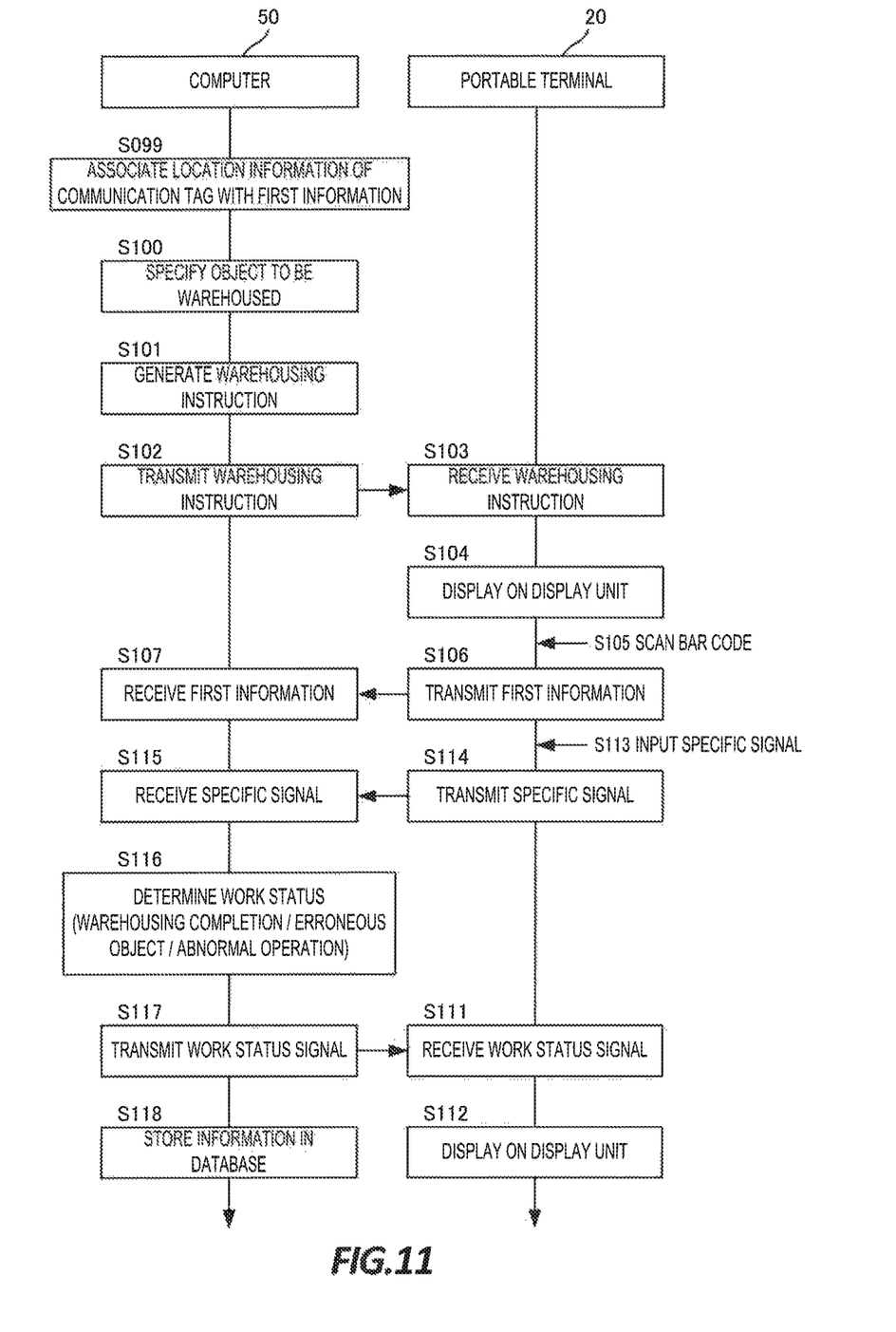
FIG. 11 is a flowchart illustrating an operation flow of a warehousing operation according to a modification.

As a result, the location information of the communication tag 10 and the first information associated with each other can be used when the warehousing instruction is generated in step S101. Therefore, the location information of the communication tag 10 can be inserted into the warehousing instruction as location information of the specified object L.

As the portable terminal 20 receives the warehousing instruction (step S103), the work information 26 is displayed on the display unit 24 as illustrated in FIG. 4 (step S104). As a result, the operator can check a work content. Note that, when the portable terminal 20 has a loudspeaker or a headphone and the like, the work content may be notified to the operator by voice.

The operator searches for an empty storage space from a plurality of storage spaces while carrying a target object L and stores the object L in the empty storage space.

As described above, an object mark 27 may be displayed in a place where the object L is stored on the warehouse map 25. Therefore, the operator can easily search for an empty storage space while watching the warehouse map 25 displayed on the display unit 24.

When information on a space for the next operation is contained in the warehousing instruction, one of a plurality of areas obtained by dividing the warehouse map 25 is highlighted or flickered as a space for the next operation.

According to this embodiment, an area including an empty storage space is displayed as a space for the next operation. In FIG. 4, the area XXX of the warehouse map 25 is highlighted. In addition, the area information may be displayed as characters in the work information 26. Furthermore, as illustrated in FIG. 4, a route guidance or a distance from the operator's location to the area for the next operation may be displayed on the display unit 24.

Note that the support system 100 may display a detailed route guidance to an empty storage space on the display unit 24. However, if a space for the next operation, that is, a destination of the operator is roughly indicated by the area as described above, it is possible to reduce an operator's stress, compared to the detailed route guidance.

As the operator scans the bar code 70 attached to the target object L stored in the storage space using the scanner 30 (step S105), the portable terminal 20 transmits the first information received from the scanner 30 to the computer 50 (step S106). Note that the first information may be directly transmitted from the scanner 30 to the computer 50 by connecting the scanner 30 and the computer 50 via the wireless router 60.

As the computer 50 acquires the first information from the portable terminal 20 (step S107), a work status is determined on the basis of the first information corresponding to the specified object L, the first information acquired from the portable terminal 20, and the location information of the communication tag 10 obtained when the first information is acquired from the portable terminal 20 (step S108). A work status signal for notifying the work status to the operator is transmitted to the portable terminal 20 (step S109).

For example, if the location of the communication tag 10 is in the vicinity of an empty storage space, and the first information corresponding to the specified object L matches the first information acquired from the portable terminal 20, it is considered that the operator stores the specified object L in the empty storage space. Therefore, in this case, the computer 50 determines that the warehousing operation of the object L has been completed as indicated in the work instruction, and transmits a warehousing completion signal as the work status signal to the portable terminal 20. In addition, information on the storage space of the object L determined from the location information of the communication tag 10, the first information contained in the bar code 70, and the information on the object L are stored in the database 53b while they are associated with each other (step S110).

If the location of the communication tag 10 is in the vicinity of an empty storage space, and the first information corresponding to the specified object L does not match the first information acquired from the portable terminal 20, it is considered that the operator stores an object L different from the specified object L in the empty storage space. Therefore, in this case, the computer 50 determines that the target object L selected by the operator is erroneous, and transmits an error signal as the work status signal to the portable terminal 20. In addition, error information is stored in the database 53b (step S110).

If the location of the portable terminal 20 is not in the vicinity of an empty storage space, it is considered that the operator performs an abnormal operation regardless of whether or not the first information corresponding to the specified object L matches the first information acquired from the portable terminal 20. Therefore, in this case, the computer 50 determines that an abnormal operation is performed, and transmits an error signal as the work status signal to the portable terminal 20. In addition, the error information is stored in the database 53b (step S110).

As the portable terminal 20 receives the work status signal from the computer 50 (step S111), the work status is displayed on the display unit (step S112). As a result, an operator can check the work status.

In this manner, in the warehousing operation using the support system 100, the work status is automatically determined, and various types of information are stored in the database 53b just as an operator stores an object L in a storage space and scans a bar code 70 attached to the object L.

Next, a shipping operation using the support system 100 will be described with reference to the operation flow of FIG. 5.

In step S200, the computer 50 specifies an object L to be shipped by an operator in the next time on the basis of shipping instruction data and specifies a storage space corresponding to the specified object L by referencing the database 53b. Note that the computer 50 externally acquires the shipping instruction data before the operation and stores it in the database 53a.

Subsequently, the computer 50 generates a shipping instruction (step S201) and transmits it to the portable terminal 20 (step S202). The shipping instruction contains information representing the shipping operation, information on the specified object L, information on the storage space for the object L specified on the basis of the location information of the communication tag 10, and the like.

As the portable terminal 20 receives the shipping instruction (step S203), the work information 26 is displayed on the display unit 24 (step S204). As a result, an operator can check the work content. Note that, when the portable terminal 20 has a loudspeaker or a headphone, the work content may be notified to the operator by voice.

Similar to the warehousing operation, in the shipping operation, one of a plurality of areas obtained by dividing the warehouse map 25 is highlighted or flickered as a space for the next operation. According to this embodiment, an area including the storage space of the object L to be shipped is displayed as a space for the next operation.

In the shipping operation, a delivery truck shipping area where the object L is finally shipped may also be displayed on the warehouse map 25.

As an operator scans the bar code 70 attached to the object L stored in the storage space using the scanner 30 (step S205), the portable terminal 20 transmits the first information received from the scanner 30 to the computer 50 (step S206). Note that the operator picks up the object L after scanning the bar code 70 using the scanner 30.

As the computer 50 acquires the first information from the portable terminal 20 (step S207), a work status is determined on the basis of the first information corresponding to the specified object L, the first information acquired from the portable terminal 20, the location information of the communication tag 10 obtained when the first information is acquired from the portable terminal 20 (step S208). A work status signal for notifying a work status to an operator is transmitted to the portable terminal 20 (step S209).

For example, if the location of the communication tag 10 is in the vicinity of the specified storage space, and the first information corresponding to the specified object L matches the first information acquired from the portable terminal 20, it is considered that an operator picks up the specified object L from the specified storage space. Therefore, in this case, the computer 50 determines that the shipping operation for the object L is completed as indicated in the work instruction, and a shipping completion signal as the work status signal is transmitted to the portable terminal 20. In addition, the shipping completion information is stored in the database 53b (step S210).

If the location of the communication tag 10 is in the vicinity of the specified storage space, and the first information corresponding to the specified object L does not match the first information acquired from the portable terminal 20, it is considered that an object L different from the specified object L is stored in the specified storage space. Therefore, in this case, the computer 50 determines that the information stored in the database 53b is erroneous, and an error signal as the work status signal is transmitted to the portable terminal 20. In addition, error information is stored in the database 53b (step S210).

If the location of the communication tag 10 is not in the vicinity of the specified storage space, it is considered that an operator performs an abnormal operation regardless of whether or not the first information corresponding to the specified object L matches the first information acquired from the portable terminal 20. Therefore, in this case, the computer 50 determines that an abnormal operation is performed, and transmits an error signal as the work status signal to the portable terminal 20. In addition, the error information is stored in the database 53b (step S210).

As the portable terminal 20 receives the work status signal from the computer 50 (step S211), the work status is displayed on the display unit 24 (step S212). As a result, an operator can check the work status.

Note that, when a plurality of objects L are to be shipped, all of processes may be repeated from step S200. Alternatively, all of the objects L and the storage spaces may be specified in step S200, and the processes subsequent to step S200 may be repeated. When all of the objects L and the storage spaces are specified in step S200, a shortest route for picking up all of the objects L and moving them to the delivery truck shipping area may be displayed on the warehouse map 25.

In this manner, in the warehousing operation using the support system 100, the work status is automatically determined, and various types of information are stored in the database 53b just by scanning the bar code 70 attached to the object L when an operator picks up the object L from the storage space.

Note that, after the shipping of the object L, the shipped object L is dispatched from the delivery truck shipping area. Therefore, if an operator scans the bar code 70 when the object L is dispatched from the delivery truck shipping area, a dispatch status of the object L can also be automatically determined.

Specifically, if the location of the communication tag 10 is in the delivery truck shipping area, and the first information acquired from the portable terminal 20 matches the first information corresponding to the object L stored in the shipping completion information, it is considered that this object L is dispatched. Therefore, in this case, the computer 50 determines that the dispatching operation of the object L is completed, and a dispatching completion signal as the work status signal is transmitted to the portable terminal 20. In addition, the dispatching completion information is stored in the database 53b.

As described above, according to this embodiment, the first information corresponding to the object L is associated with the automatically acquired location information of the communication tag 10. Therefore, it is possible to specify the location of the object L without a cumbersome work. Therefore, it is possible to efficiently perform the warehousing and shipping operation.

Using the location information of the communication tag 10 and the first information associated with each other, it is possible to generate a detailed work instruction.

The work status is automatically determined just by allowing an operator to scan the bar code 70 attached to the object L during the warehousing and shipping operation. As a result, it is possible to automatically acquire various types of information while reducing a work object of the operator.

According to this embodiment, since a space for the next operation, that is, a destination of the operator is roughly indicated by the area, it is possible to reduce an operator's stress, compared to the detailed route guidance.

Second Embodiment

Next, a support system 200 according to a second embodiment of the invention will be described with reference to the accompanying drawings.

Figure 6:
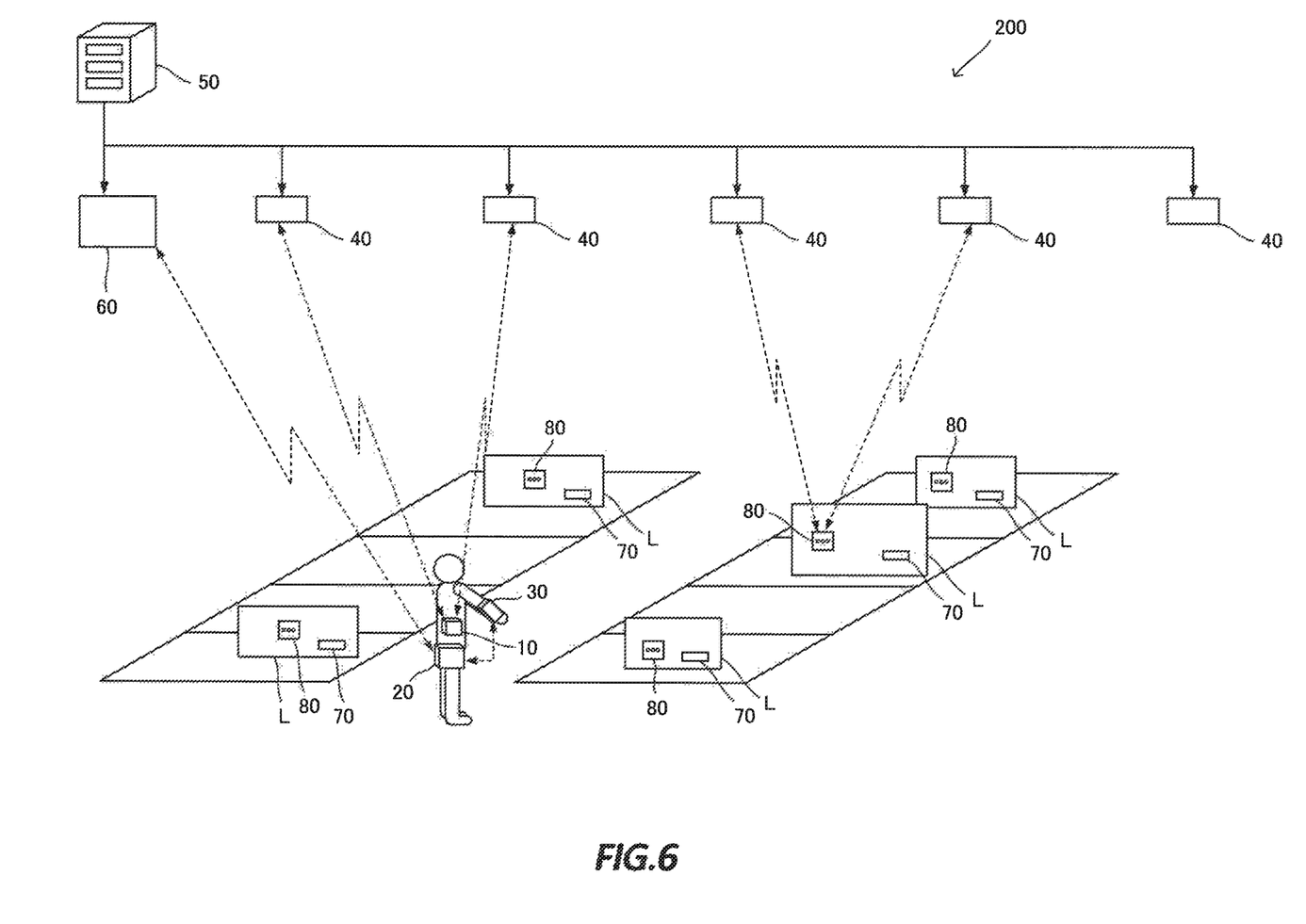
FIG. 6 is diagram schematically illustrating a warehousing and shipping operation support system according to a second embodiment of the invention.

As illustrated in FIG. 6, the support system 200 is different from the support system 100 in that a light-emitting diode (LED) communication tag (hereinafter, referred to as an LED tag) 80 as an object radio communication terminal is installed in each object L. Hereinafter, the description will be made by focusing on differences from the support system 100, in which like reference numerals denote like elements as in the support system 100, and they will not be described repeatedly. Note that, as described above, the object L may include various types of articles such as a building material, furniture, a tire, a container containing an article, and an empty container containing no article.

Figure 7:
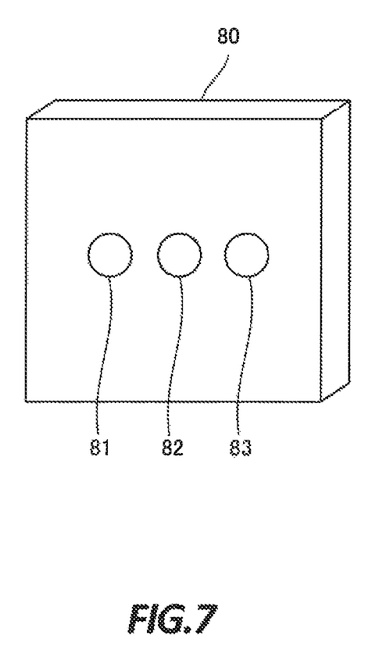
FIG. 7 is an exterior view illustrating an LED communication tag.
Figure 8:
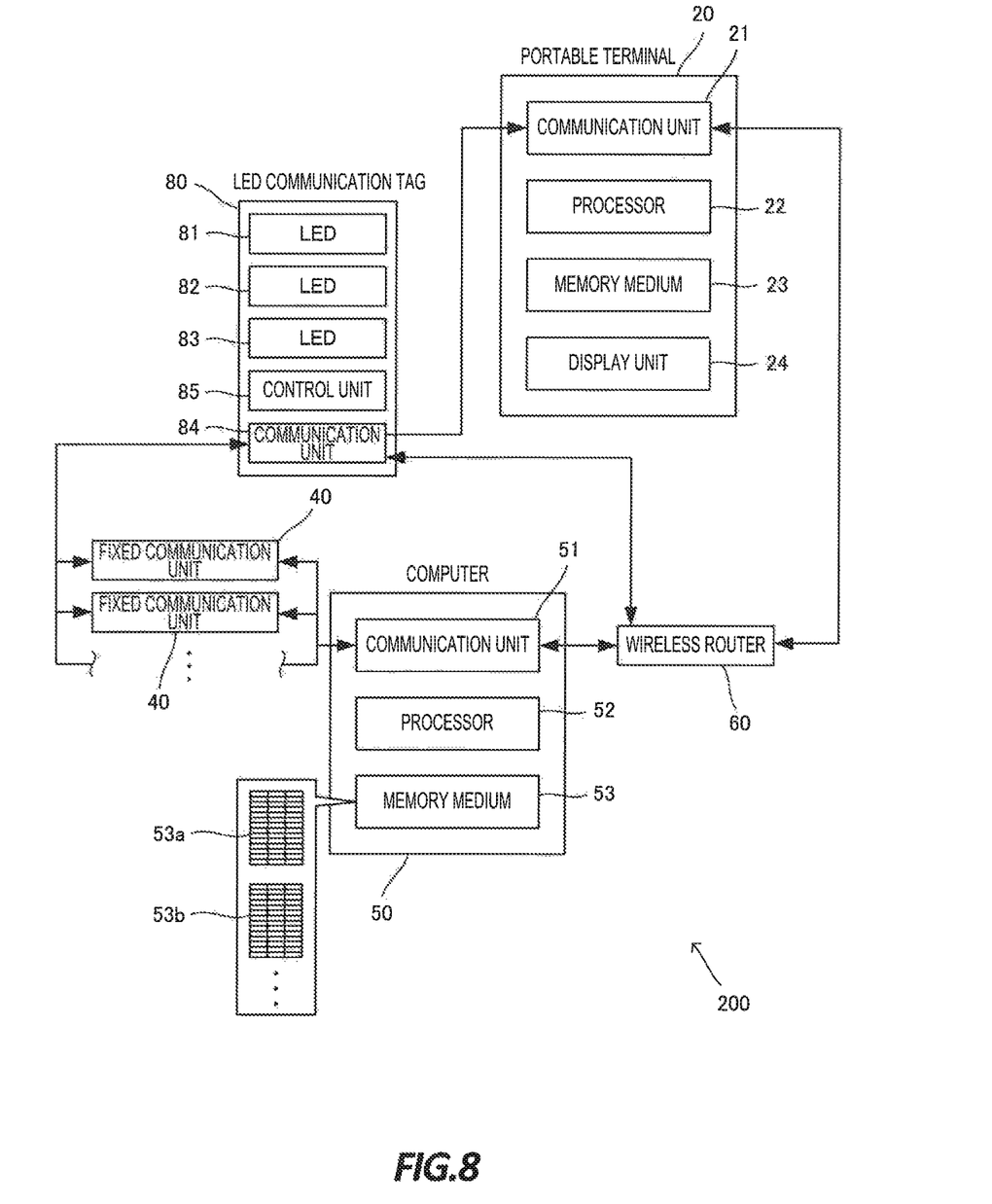
FIG. 8 is a schematic block diagram illustrating the warehousing and shipping operation support system according to the second embodiment of the invention.

As illustrated in FIGS. 7 and 8, the LED tag 80 includes LEDs 81 to 83, a communication unit 84 for performing radio communication, and a control unit 85 that controls operations of the LEDs 81 to 83 and the communication unit 84. Note that, in FIG. 8, only a single LED tag 80 is illustrated, and the communication tag 10 and the scanner 30 are not illustrated for simplicity purposes.

The LED tag 80 can receive various instruction signals transmitted from the computer 50 via the wireless router 60 using the communication unit 84. The communication unit 84 may perform communication using the BLE communication scheme and the UWB communication scheme in addition to a typical communication scheme. The control unit 85 controls operations of the LEDs 81 to 83 and the communication unit 84, or the like on the basis of the instruction signal received via the communication unit 84.

The LED tag 80 can transmit an identification signal from the communication unit 84 within a predetermined range on the basis of the BLE scheme. The transmission and stop operations of the identification signal are performed by receiving an instruction from the computer 50.

The second coded information contained in the identification signal (hereinafter, referred to as second information) includes information on the object L installed with this LED tag 80. The second information contained in the identification signal transmitted from the LED tag 80 installed in each object L is stored in the database 53b while being associated with the first information contained in the bar code 70 attached to each object L. Note that this information may be stored in a database different from the database 53b.

Figure 9:
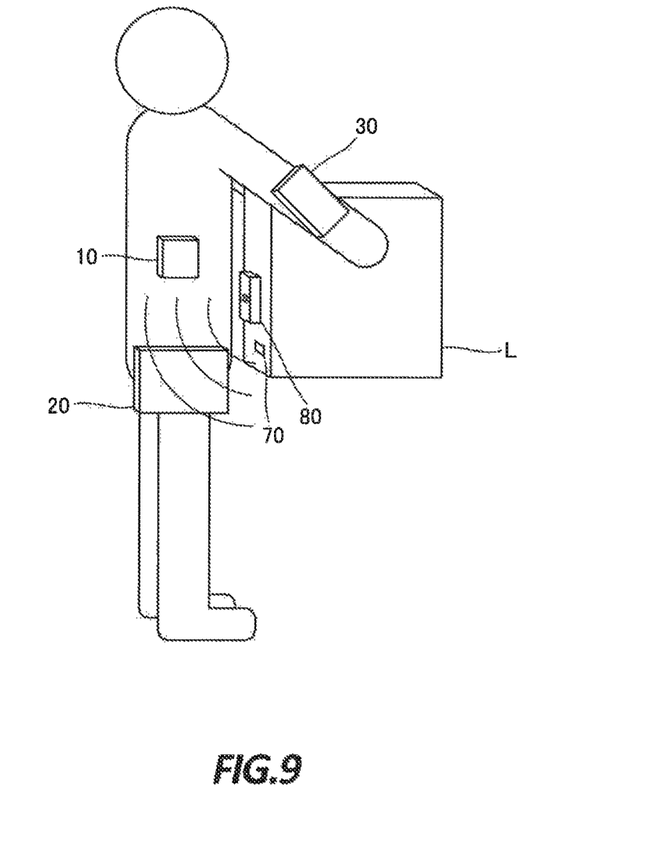
FIG. 9 is a diagram illustrating a state in which an operator picks up an object.

The predetermined range for transmitting the identification signal from the LED tag 80 is set such that the identification signal reaches the portable terminal 20 held by an operator when the operator picks up the object L as illustrated in FIG. 9. Specifically, the predetermined range is set to, for example, 15 to 30 cm.

The LED tag 80 communicates with each fixed communication unit 40 using the UWB scheme at all times. The computer 50 positions a location of the LED tag 80 on the basis of time for allowing the LED tag 80 to receive pulse signals transmitted from each of two fixed communication units 40 and return them to each fixed communication unit 40. Therefore, in the support system 200, it is possible to automatically acquire the location of each object L in addition to the location of the communication tag 10.

Subsequently, a shipping operation using the support system 200 will be described with reference to the operation flow of FIG. 10. Note that, when the shipping operation is performed, the LED tag 80 receives an instruction from the computer 50 and transmits an identification signal at all times (step S300).

In step S301, the computer 50 specifies an object L for which an operator performs the next shipping operation on the basis of the shipping instruction data and specifies a storage space corresponding to the specified object L by referencing the database 53b. In this case, the location information of the LED tag 80 installed in the specified object L may also be referenced.

In step S302, the computer 50 transmits a shipping instruction to the portable terminal 20.

As the portable terminal 20 receives the shipping instruction (step S303), the work information is displayed on the display unit 24 (step S304).

As a result, an operator who checks the work content moves to the storage space of the specified object L (step S305).

The computer 50 transmits an operation instruction signal for performing a viewable specific operation to the LED tag 80 as the location of the communication tag 10, that is, the operator's location approaches the LED tag 80 installed in the specified object L within a predetermined distance (step S306).

As the LED tag 80 receives the operation instruction signal from the computer 50 (step S307), the LEDs 81 to 83 are lighted or flickered in a pattern that indicates the specified object L (step S308).

As a result, an operator can easily specify the object L to be shipped.

Note that the lighting or flickering pattern of the LEDs 81 to 83 may be set arbitrarily, and a combination of lighting and flickering may also be employed. In addition, for example, the LED 81 may have a red color, the LED 82 may have a blue color, and the LED 83 may have a yellow color, so that the LEDs 81 to 83 can be separately used for each operator.

As an operator picks up the object L (step S309), the portable terminal 20 held by the operator enters a predetermined range of the LED tag 80 installed in the object L as illustrated in FIG. 9. As a result, the portable terminal 20 automatically receives the identification signal transmitted from the LED tag 80 via the communication unit 21 (step S310) and transmits the received identification signal to the computer 50 (step S311).

As the computer 50 acquires the identification signal from the portable terminal 20 (step S312), a work status is determined on the basis of the second information corresponding to the specified object L, the second information contained in the identification signal acquired from the portable terminal 20, and the location information of the communication tag 10 obtained when the second information is acquired from the portable terminal 20 (step S313).

Then, the processes subsequent to step S209 of the shipping operation of the support system 100 are performed using the second information instead of the first information.

As described above, in the shipping operation using the support system 200 according to this embodiment, the work status is automatically determined, and various types of information are stored in the database 53b just as an operator picks up the object L from the storage space. Therefore, it is possible to efficiently perform the shipping operation, compared to the support system 100 according to the first embodiment.

Since a viewable specific operation is performed for the LED tag 80 as the location of the communication tag 10, that is, the operator's location approaches the LED tag 80 installed in the specified object L within a predetermined distance, it is possible to allow an operator to easily specify the object L to be shipped. The predetermined distance is set to, for example, 10 m.

While embodiments of the invention have been described hereinbefore, they are just for illustrative purposes, and are not intended to limit the scope of the invention to the specific configurations described in the aforementioned embodiments.

For example, although it is assumed that the support systems 100 and 200 are employed in a logistic warehouse or the like in the aforementioned embodiments, the support systems 100 and 200 may also be employed in other fields such as a shop warehouse and a hospital warehouse.

Although the communication tag 10 and the portable terminal 20 are held by an operator in the aforementioned embodiments, they may be installed in a vehicle, a robot, or the like, for example, when the warehousing and shipping operation is performed using a vehicle such as a forklift truck, a robot, and the like.

Figure 3:
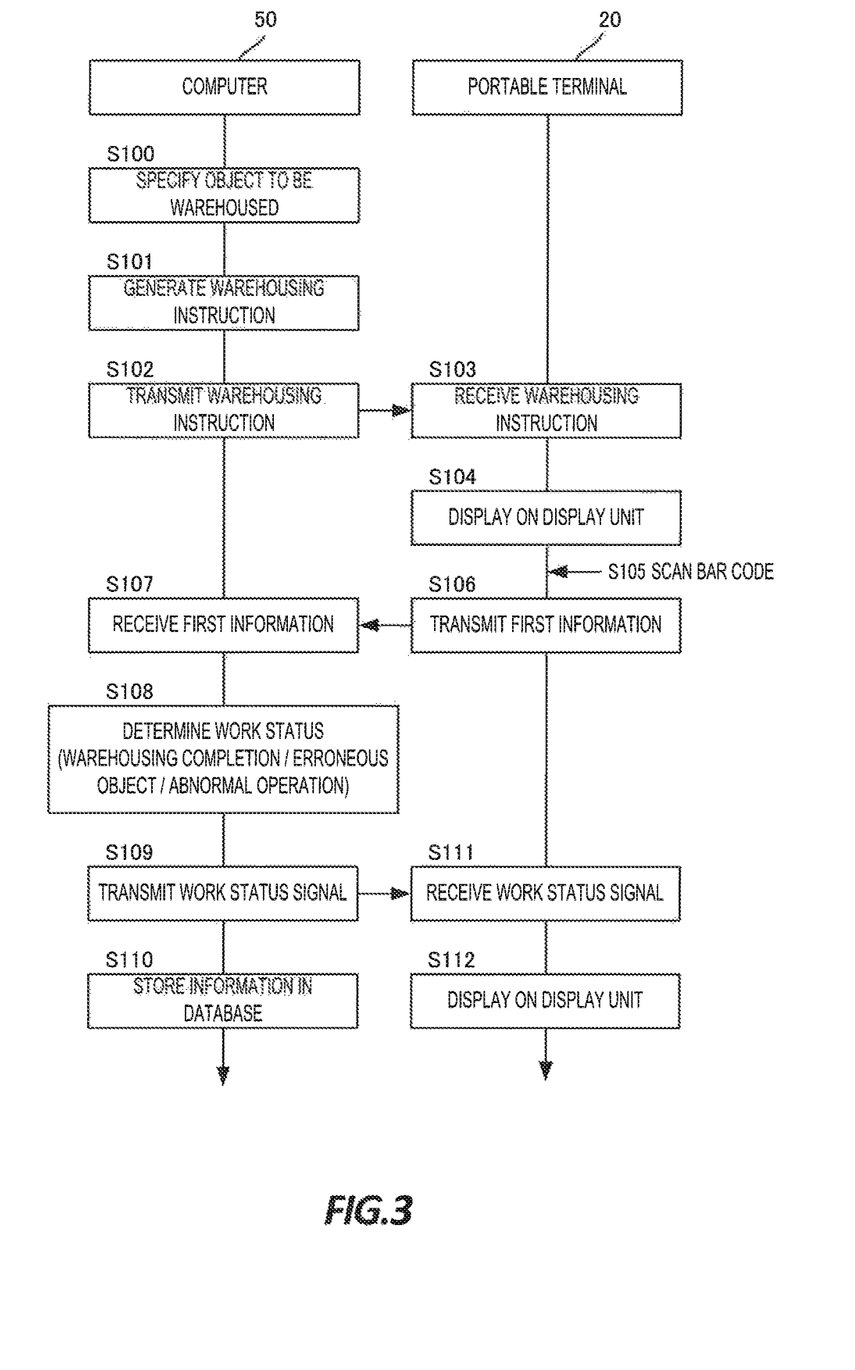
FIG. 3 is a flowchart illustrating an operation flow of a warehousing operation.
Figure 5:
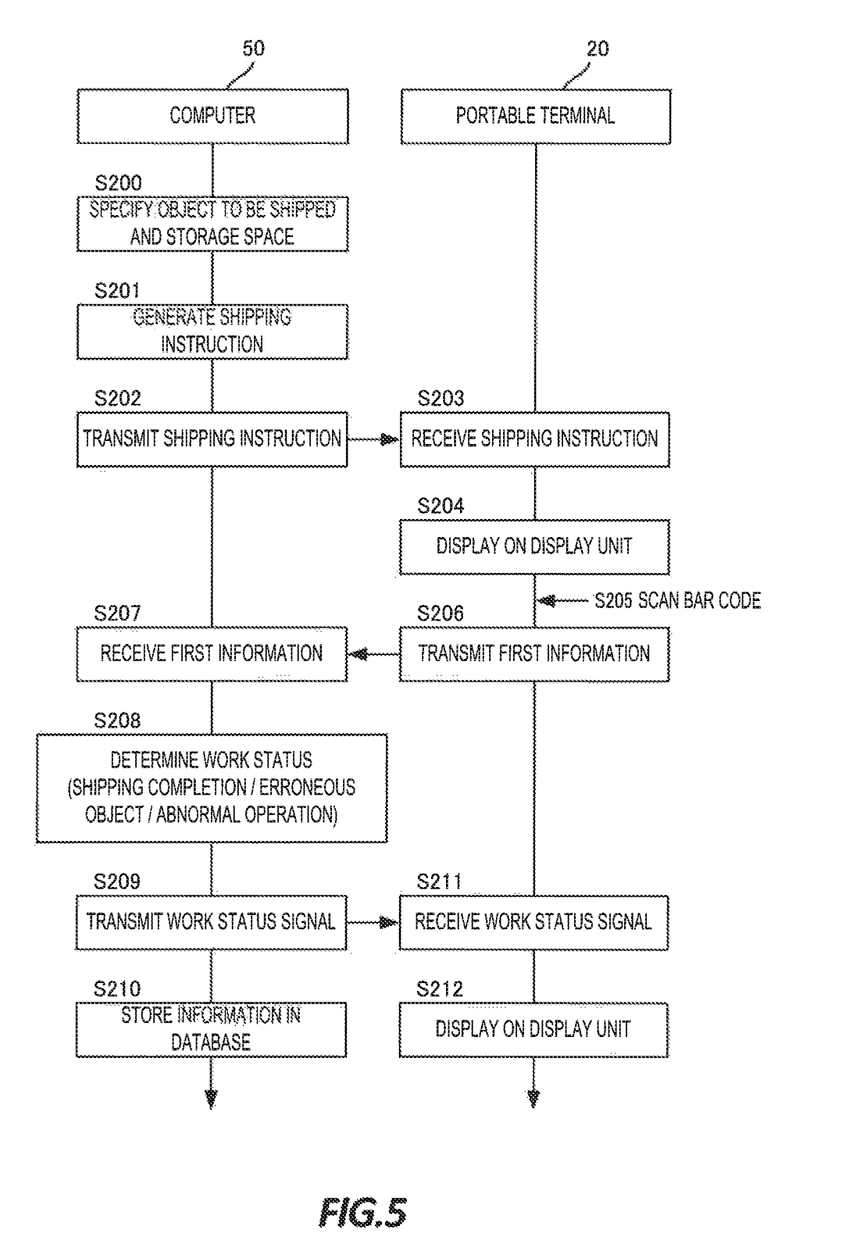
FIG. 5 is a flowchart illustrating an operation flow of a shipping operation.
Figure 10:
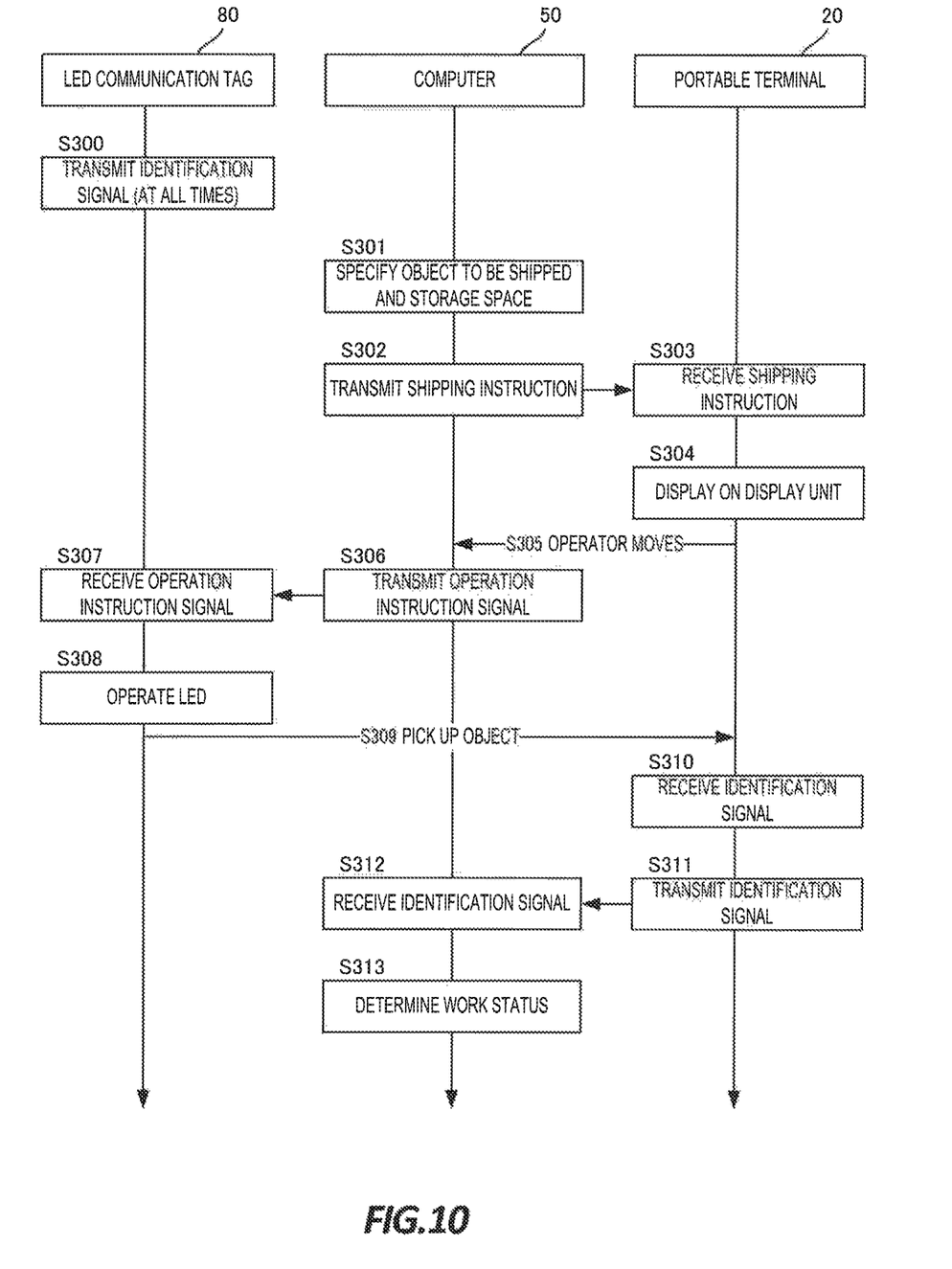
FIG. 10 is a flowchart illustrating an operation flow of a shipping operation.

Although the computer 50 performs steps S100 to S102 and steps S107 to S110 of FIG. 3, steps S200 to S202 and steps S207 to S210 of FIG. 5, and steps S301, S302, S306, and the processes subsequent to step S312 of FIG. 10 in the aforementioned embodiments, some of steps may also be performed by the portable terminal 20 in a distributed manner.

Although the portable terminal 20 and the computer 50 are connected to each other via the wireless router 60 in the aforementioned embodiments, the portable terminal 20 and the computer 50 may also be connected to each other via the Internet.

Alternatively, the computer 50 may be connected to a cloud server on the Internet, and the aforementioned processes performed by the computer 50 may be executed by the cloud server. In this case, the support systems 100 and 200 may not have the computer 50, and each device such as the portable terminal 20 may be directly connected to the cloud server via the Internet.

Although the communication tag 10 and the portable terminal 20 are provided separately in the aforementioned embodiments, the communication tag 10 and the portable terminal 20 may be integrated with each other.

Although the bar code 70 is employed as the optical recognition code in the aforementioned embodiments, a two-dimensional code, a marker indicating information based on a color transition, or the like may also be employed.

Although the identification signal of the LED tag 80 is transmitted using the BLE scheme in the second embodiment, other communication schemes may also be employed as long as the identification signal can be transmitted within a predetermined range.

Although the LED tag 80 has LEDs 81 to 83 in the second embodiment, the number of LEDs may change arbitrarily. Alternatively, lamps other than the LED may also be employed, and a display unit may also be provided instead of the LED.

In the first embodiment, as an operator scans the bar code 70 during a warehousing operation, a work status is determined on the basis of the location information of the communication tag 10 at that time, and the storage space of the object L is specified and is stored in the database 53*b* (steps S105 to S110 in FIG. 3). However, as described above, when an operator scans the bar code 70 before the operator arrives at the storage space, the work status is determined as an abnormal operation.

In this regard, as illustrated in FIG. 11, when a specific signal is input after scanning the bar code 70, the work status may be determined, and the storage space of the object L may be specified on the basis of the location information of the communication tag 10 at that time (steps S113 to S118). Note that details of steps S116 to S118 are similar to those of steps S108 to S110 of FIG. 3 except that the work status is determined, and the storage space of the object L is specified on the basis of the location information of the communication tag 10 obtained when a specific signal is input.

As a method of inputting a specific signal to the computer 50, it may be conceived that, for example, a warehousing check button is displayed on the display unit 24 of the portable terminal 20, and a specific signal is transmitted to the computer 50 as an operator presses this button. In addition, a specific signal may be transmitted to the computer 50 when an operator makes a sound "warehousing is completed" using a voice input function of the portable terminal 20.

As a result, a work status can be determined regardless of when an operator scans the bar code 70. Therefore, it is possible to allow an operator to flexibly change the timing for scanning the bar code 70.

Figure 12:
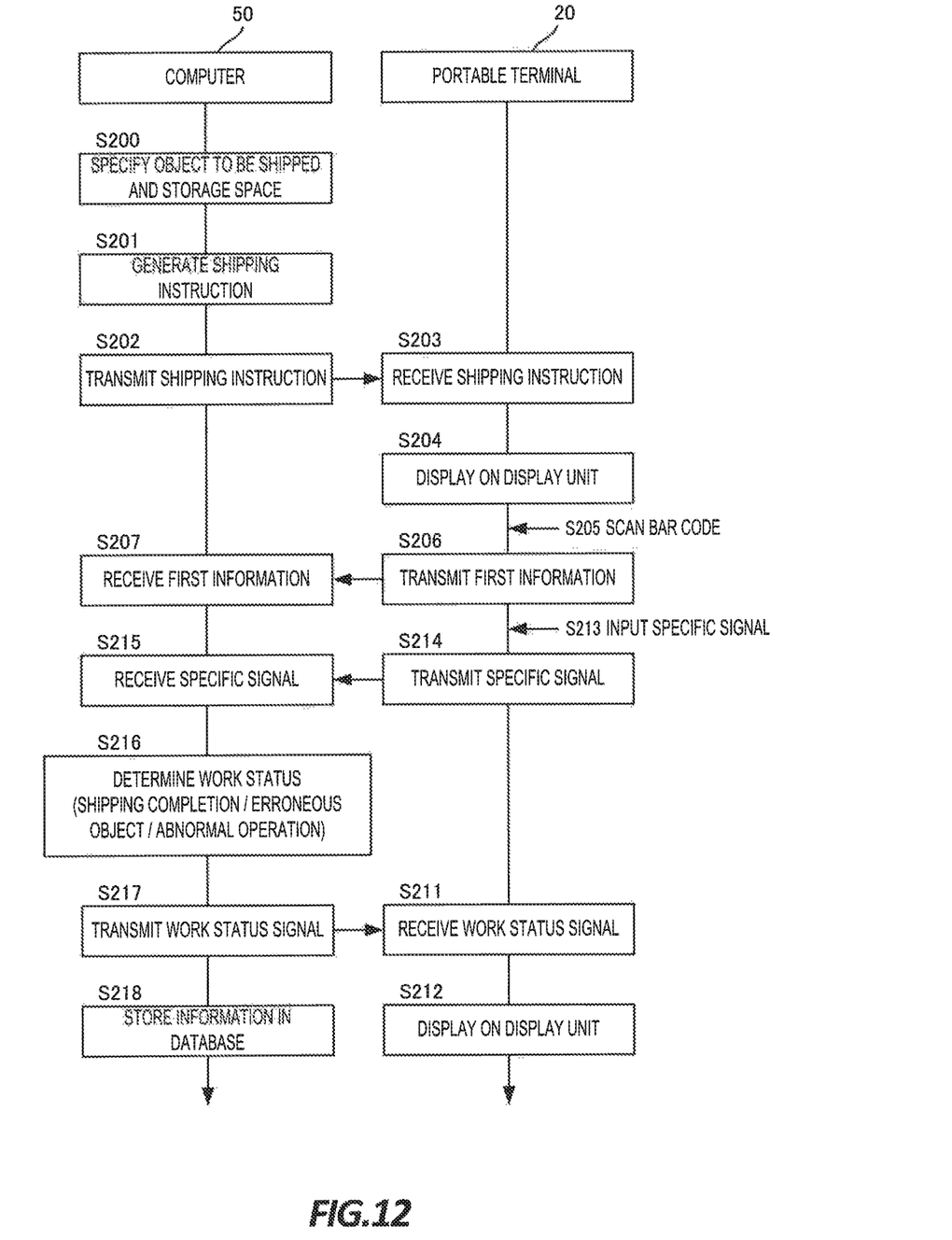
FIG. 12 is a flowchart illustrating an operation flow of a shipping operation according to a modification.

Note that, in the shipping operation, the work status may also be determined as a specific signal is input after the scanning of the bar code 70 (steps S213 to S218) as illustrated in FIG. 12. Note that details of steps S216 to S218 are similar to those of steps S208 to S210 of FIG. 5 except that the work status is determined on the basis of the location information of the communication tag 10 obtained when a specific signal is input.

Various programs executed by the portable terminal 20 and the computer 50 may be stored in a non-transitory recording medium such as a CD-ROM.

This application is based upon and claims the benefit of priority from Japanese Patent Application No. 2015-151817, filed on Jul. 31, 2015; and Japanese Patent Application No. 2015-253457, filed on Dec. 25, 2015, the entire contents of all of which are incorporated herein by reference.

The invention claimed is:

1. A warehousing operation support system, the system comprising:
   a plurality of fixed communication units (40) configured to transmit pulse signals;
   a communication tag (10) configured to receive the pulse signals from the plurality of fixed communication units (40) and return the pulse signals to the plurality of fixed communication units (40);
   a scanner (30) configured to scan optical recognition codes that are attached to objects (L), wherein each optical recognition code is associated with first information on the respective object (L);
   a computer (50) comprising a processor (52), and a memory (53), wherein:
      the computer (50) is in wireless communication with the scanner (30),
      the computer (50) is in communication with the plurality of fixed communication units (40),
      the memory (53) stores a database (53*b*) that includes information on stored objects (L), the first information associated with the optical recognition codes, and information on storage spaces (C) of the stored object (L), and
      the computer (50) is programmed to:
         receive an indication that the optical recognition code attached to an object is scanned by the scanner (30),
         determine a location of the communication tag (10) at the time that the object is scanned by the scanner (30) based on a time taken for the communication tag (50) to receive the pulse signals from the plurality of fixed communication units (40) and return the pulse signals to the plurality of fixed communication units (40),
         determine if the location of the communication tag (10) is in a vicinity of an empty storage space (C) using the information on storage spaces (C) of the stored object (L) stored in the database, and
         after determining that the location of the communication tag is in a vicinity of an empty storage space (C), modify the database to associate that storage space (C) with the first information associated with the optical recognition code of the object (L) scanned by the scanner (30) and with the information on that object (L).

2. The warehousing operation support system as set forth in claim 1, further comprising:
   a portable terminal (20) comprising a communication unit (21), a processor (22), a memory (23), and a display unit (24), wherein:
      the scanner (30) is communicably connected to the portable terminal (20),
      the computer (50) further comprises a communication unit (51), and
      the computer (50) is in wireless communication with the scanner (30) via the communication unit (21) of the portable terminal (20) and the communication unit (51) of the computer (50).

3. The warehousing operation support system as set forth in claim 2, wherein the computer (50) is programmed to, after determining that the location of the communication tag is in a vicinity of an empty storage space (C), transmit a warehousing completion signal to the portable terminal (20).

4. The warehousing operation support system as set forth in claim 2, wherein the computer (50) is further programmed to generate a warehousing instruction and transmit the warehousing instruction to the portable terminal (20).

5. The warehousing operation support system as set forth in claim 4, wherein the warehousing instruction includes information representing a warehousing operation and information on the object (L) to be stored.

6. The warehousing operation support system as set forth in claim 4, wherein the warehousing instruction includes information on an area where a next warehousing operation is to be performed.

* * * * *